US009230430B2

(12) United States Patent
Civelli et al.

(10) Patent No.: US 9,230,430 B2
(45) Date of Patent: Jan. 5, 2016

(54) DETECTING REMOVAL OF WEARABLE AUTHENTICATION DEVICE

(71) Applicant: Google Inc., Mountain View, CA (US)

(72) Inventors: Jay Pierre Civelli, Sunnyvale, CA (US); Aaron Leiba, San Francisco, CA (US); Chris Hopman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 70 days.

(21) Appl. No.: 14/091,376

(22) Filed: Nov. 27, 2013

(65) Prior Publication Data

US 2015/0147065 A1 May 28, 2015

(51) Int. Cl.
*G06K 5/00* (2006.01)
*G08C 23/04* (2006.01)

(52) U.S. Cl.
CPC ............ *G08C 23/04* (2013.01); *G08C 2201/11* (2013.01); *G08C 2201/112* (2013.01); *G08C 2201/60* (2013.01)

(58) Field of Classification Search
CPC ... G06F 21/35; G06F 19/3418; G06F 19/322; H04L 9/3234; H04L 9/3231; H04L 63/0853; H04L 63/0492; H04W 88/02; H04W 12/06; G06Q 50/24; G06Q 10/10; G06Q 20/322; G08B 21/0453; G08B 21/0446; G08B 21/22; G08C 17/02; G08C 2201/11; G08C 2201/112; G08C 2201/60; G08C 23/04; G06K 19/07703; G06K 17/0022; G06K 19/06196; G06K 19/07707
See application file for complete search history.

(56) References Cited

U.S. PATENT DOCUMENTS

| | | | | |
|---|---|---|---|---|
| 6,518,493 | B1 * | 2/2003 | Murakami et al. | 136/257 |
| 6,825,751 | B1 * | 11/2004 | Kita et al. | 340/5.61 |
| 8,045,961 | B2 | 10/2011 | Ayed et al. | |
| 8,249,558 | B2 | 8/2012 | Olsen et al. | |
| 8,371,501 | B1 | 2/2013 | Hopkins | |
| 8,478,196 | B1 | 7/2013 | Hewinson | |
| 8,542,833 | B2 | 9/2013 | Devol et al. | |
| 2003/0046228 | A1 | 3/2003 | Berney | |
| 2003/0172271 | A1 | 9/2003 | Silvester | |
| 2004/0256452 | A1 | 12/2004 | Coughlin et al. | |
| 2005/0105734 | A1 | 5/2005 | Buer et al. | |
| 2007/0150736 | A1 | 6/2007 | Cukier et al. | |
| 2007/0198848 | A1 | 8/2007 | Bjorn | |
| 2008/0100414 | A1 | 5/2008 | Diab et al. | |
| 2009/0237223 | A1 | 9/2009 | Zimmerman et al. | |
| 2010/0091995 | A1 * | 4/2010 | Chen et al. | 380/278 |
| 2010/0218249 | A1 | 8/2010 | Wilson et al. | |
| 2011/0314539 | A1 * | 12/2011 | Horton | 726/20 |

(Continued)

FOREIGN PATENT DOCUMENTS

| | | |
|---|---|---|
| CA | 2732945 | 8/2011 |
| WO | 2011157750 A2 | 12/2011 |

OTHER PUBLICATIONS

ISR and Written Opinion of PCT/US2014/016001 dated May 20, 2014.

*Primary Examiner* — Thien T Mai
(74) *Attorney, Agent, or Firm* — Morris & Kamlay LLP

(57) ABSTRACT

A wearable device is disclosed that, while being worn by a user, may allow a user to authenticate to a second device such as a smartphone without having to enter an unlock code such as a personal identification number. The wearable device may detect when the user removes it. Removal of the wearable device may cause it to be disabled and prevent it from being used to authenticate a subsequent user to the second device until it is re-enabled.

18 Claims, 4 Drawing Sheets

(56) References Cited

U.S. PATENT DOCUMENTS

| | | | | |
|---|---|---|---|---|
| 2012/0075062 | A1 | 3/2012 | Osman et al. | |
| 2012/0109828 | A1 | 5/2012 | Phillips | |
| 2013/0021225 | A1 | 1/2013 | Braun et al. | |
| 2013/0332353 | A1 | 12/2013 | Aidasani et al. | |
| 2014/0055352 | A1 | 2/2014 | Davis et al. | |
| 2014/0106677 | A1 | 4/2014 | Altman et al. | |
| 2014/0143785 | A1 * | 5/2014 | Mistry et al. | 718/104 |
| 2014/0249853 | A1 * | 9/2014 | Proud et al. | 705/3 |

* cited by examiner

DETECTING REMOVAL OF WEARABLE AUTHENTICATION DEVICE

BACKGROUND

Many people authenticate themselves to devices they use during their day-to-day lives using passwords, PINs, and/or swipe patterns. For example, a user may secure a smartphone by requiring a swipe pattern or PIN to be entered to access the device. These methods of authentication may be tedious and less secure than using a wearable device such as a ring. The ring may use a short distance communication protocol such as NFC and authenticate the user to the device with a simple gesture such as tapping the back of the smartphone or mere proximity of the ring to the smartphone may be sufficient to trigger the authentication protocol. The ring may not come with its own power source; rather, it may be powered through induction from the device to which it authenticates. This system may not be ideal if the ring is lost or a user is forced to perform a gesture to authenticate to the device. In such instances, mere possession of the ring or similar token may be sufficient to authenticate any user to another device such as a smartphone.

BRIEF SUMMARY

According to an implementation of the disclosed subject matter, a wearable device is disclosed. The device includes a photocell that may be configured to provide power to at least one of a microcontroller, an infrared light emitting diode ("LED"), and a computer readable storage module. The computer readable storage module may be a component of the device and it may be configured to temporarily store an unlock code. The device may include an infrared LED configured to emit a first signal received from the microcontroller. The device may include a reflective material that is configured to reflect the first signal from the infrared LED. The infrared receptor may be disposed at a distance from the reflective material. The microcontroller may be configured to accumulate power from the photocell and provide the first signal to the infrared LED when a threshold amount of power has been accumulated by the microcontroller. The microcontroller may be configured to receive the second signal from the infrared receptor and it may compare the first signal to the second signal.

In an implementation, a system is provided that includes a wearable device and a second device. The wearable device may include a photocell, a wear trigger, a microcontroller, a coil, a microchip, and a computer readable storage module. The wear trigger may be configured to provide an indication of whether or not the wearable device is being worn to the microcontroller. The microcontroller may disguise an unlock code stored in the computer readable storage module if it receives an indication that the wearable device is not being worn. The coil may generate power from an electromagnetic field of the second device that powers the microchip. The microchip may be configured to obtain the unlock code from the computer readable storage module and communicate the unlock code to the second device. The unlock code may authenticate the wearable device to the second device. The second device configured to emit the electromagnetic field and request authentication from the microchip of the wearable device. The second device may be configured to receive the unlock code from the microchip and to authenticate the wearable device to the second device.

In an implementation, a wearable device is provided that includes a photocell configured to provide power to at least one of a microcontroller, a wear trigger, and a computer readable storage module. The wearable device may have an interior cavity that may accommodate a portion of a user's body. The computer readable storage module may be configured to temporarily store an unlock code. The wear trigger may be configured to detect the presence of a part of a user's body within the interior cavity and provide an indication to the microcontroller whether the part of the user's body is detected within the interior cavity. The microcontroller may be configured to disable the wearable device if the wear trigger does not detect the part of the user's body within the interior cavity.

An advantage of the disclosed subject matter is that a token may be secured subsequent to removal from an authenticated user's person. An additional advantage is that the token does not require a battery or other external power source. Rather, the token may generate power for its circuitry/hardware using passive technologies such as NFC and/or a photocell. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
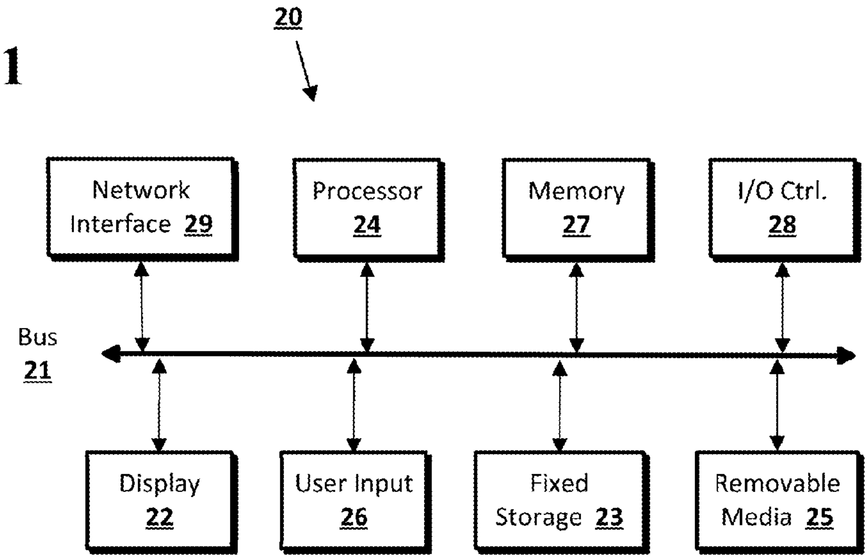
FIG. 1 shows a computer according to an implementation of the disclosed subject matter.

As described above, one method or system for authenticating a user to a device utilizes a wearable token such as a ring or bracelet. The token may contain authentication credentials that a user may input upon wearing the token. The disclosed device, methods, and systems herein relate to securing the token once it is removed to prevent authentication of a subsequent user to a user's device utilizing the user's token. As disclosed herein, the ring or token may have the ability to be locked. A PIN or swipe pattern may be set when the token is paired with the device (such as a smartphone) the first time the ring is used. So long as the token is worn, it may be utilized to authenticate the user to the device using the entered PIN or other unlock code. Subsequent the initial set-up, where a user enters an unlock code for the token to use to authenticate the user to the device, the user may be asked for the token's unlock code. Upon successful entry of the unlock code, the token may be unlocked and function normally (i.e., providing credentials to trusted applications). The token may switch to a locked state when the user removes it (e.g., removes a ring from a finger or a bracelet from a wrist).

A ring token device is disclosed herein that may be applicable to other tokens such as a bracelet, glove, or watch. A mechanism is provided to detect when the ring is removed and switch it to a locked state. The locked state may require the user to enter an unlock code to unlock the ring the next time the user adorns it before it can be used to authenticate the user again. While the user must enter an unlock code, it is a one-time operation to authenticate the ring to the device so long as the user keeps the ring on the user's finger (or wrist for other types of tokens). Subsequent use of the token may not require entry of an unlock code (e.g., PIN, password, swipe gesture, etc.) so long as the user continues to wear the ring after authentication.

To detect when the ring is removed, light sensors may be used. A photocell on the outside of the ring may generate power that is provided to power a micro-controller, a small flash memory module, and a light sensor and emitter. When the micro controller has accumulated enough power, it may send a signal through an infrared LED. That beam of light may be reflected on the other side of the ring and detected by the infrared light sensor on the other side. The micro controller, once it has checked that the signal it received matches the signal it sent, may detect that the ring was removed. When the ring is worn, that signal is blocked by the user's finger. Other mechanisms may also be used to detect the worn or non-worn state of the ring, such as pressure sensors, one or more switches, conductivity sensors on the inside of the ring, etc. When the ring is detected to be worn, a wear-state flag can be set in the ring's memory. For example, the wear-state flag can be set to 1 when the ring is being worn. When the ring is not worn, the wear-state flag can be set to 0.

The use of the PIN or other unlock code can be implemented by storing a version of the PIN (e.g., plaintext, a hashed version, etc.) in persistent (e.g., flash) memory in the ring. The ring can be programmed to provide authentication information in response to a query only when the wear-state flag indicates that that the ring is being worn and it receives correct PIN information. The PIN can be entered by the user into a device to which the ring is to provide authentication information. When the device queries the ring, it can include the PIN information as part of the initial query. When the query powers up the ring, the ring can check the wear-state flag and verify the PIN by comparing the PIN information received in the query with the PIN information stored in the ring. If both the wear-state flag indicates that the ring is being worn and the PIN information is successfully verified, then the ring can provide authentication information to the device in response to the query. If either or both of these conditions are not met, the ring will not provide authentication information and may provide an alternative message, such as an error message. In an implementation, the device provides a cleartext version of the PIN and a hashed version of the PIN is stored in ring memory. The ring hashes the received cleartext PIN and then compares it to the hashed version. If they match and the wear-state flag indicates that the ring is being worn, then the ring can provide authentication information to the device. The cleartext PIN may be modified, deleted or overwritten from ring memory to reduce the likelihood that the PIN is compromised.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
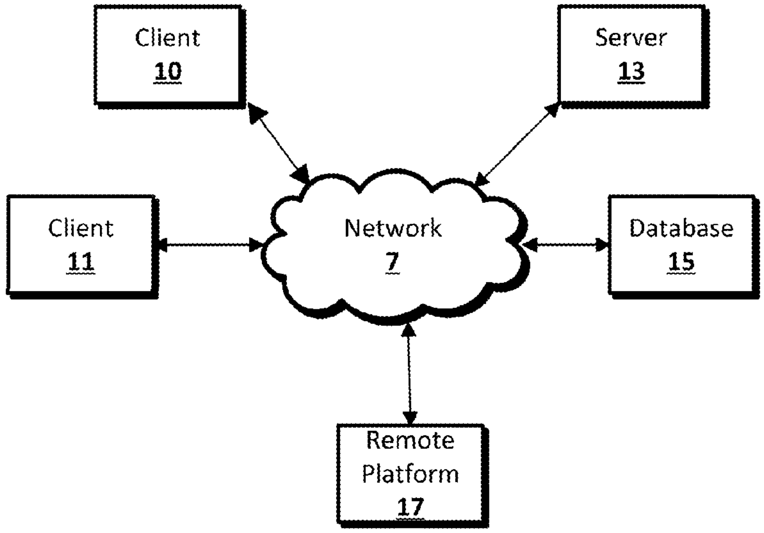
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3A:
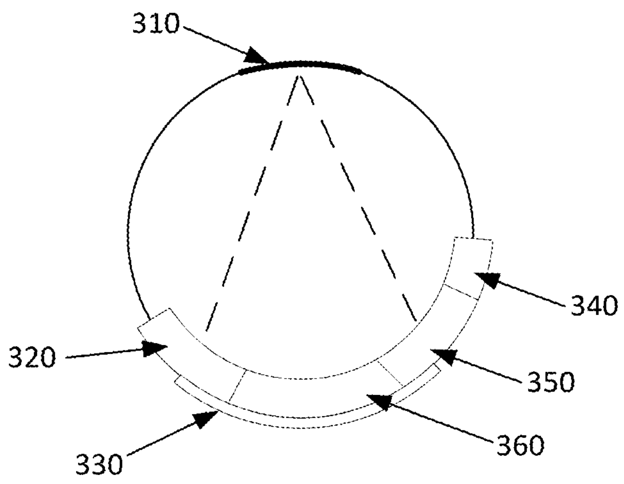
FIG. 3A shows an example device and FIG. 3B shows an example of how the components of the device in FIG. 3A may be arranged according to an implementation disclosed herein.
Figure 3B:
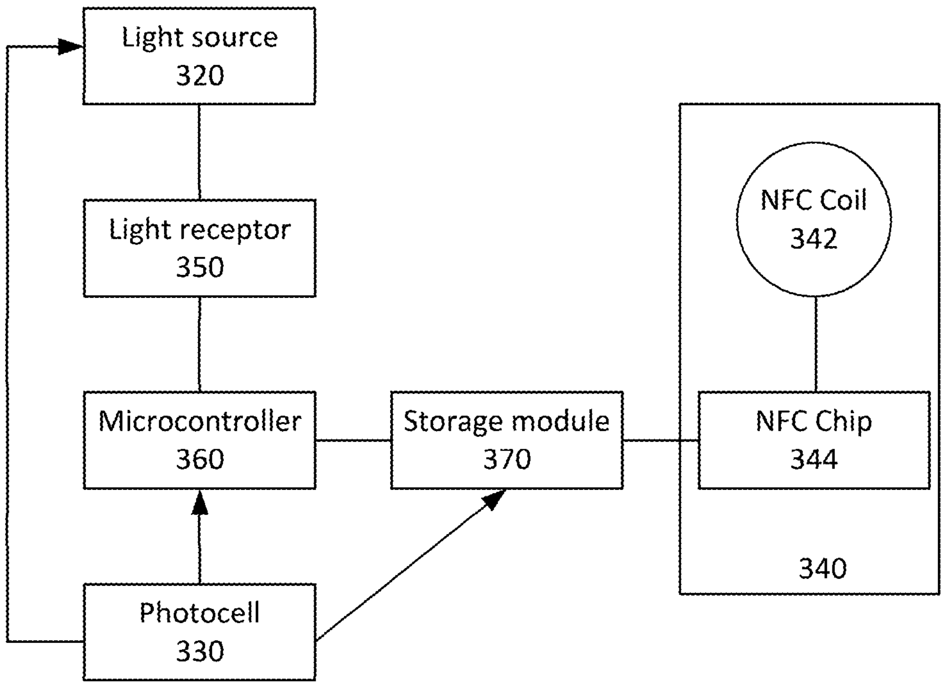

In an implementation, a wearable device (or token) is provided such as a watch, a glove, a ring, a bracelet, etc. FIGS. 3A and 3B show an example of a ring as a wearable device. The wearable device may include a photocell or photoresistor 330. For example, cadmium sulphide photocells can be found in a variety of consumer electronics such as a camera and streetlights and may be utilized according to any implementation disclosed herein. The photocell 330 may provide power to at least one of a microcontroller 360, an infrared LED (or other type of light source including visible light) 320, and a computer readable storage module. The arrows shown in FIG. 3B indicate the hardware components of the ring in FIG. 3B that may be powered by the photocell 330. Power from the photocell 330 may be stored in a capacitor that in turn provides power to the components of the wearable device or token. For example, the photocell 330 may produce power that it stores in a capacitor which is connected to or provides power to at least one of the microcontroller, the computer readable storage module 370, the light source, and/or light receptor.

The computer readable storage module 370 may be configured to temporarily store an unlock code (e.g., a PIN, gesture, or swipe pattern). The infrared LED 320 may be configured to emit a first signal received from the microcontroller 360. The first signal may be an indication to activate the LED or emit light or to activate the LED according to a pattern of blink. The first signal may refer to a computer readable representation of the light emitted. In some instances, the first signal may be an indication that light has been emitted by the light source (e.g., the infrared LED). For example, a flag may be set in a memory module to indicate that the light source emitted light, and/or the light source received or was issued a command by the microcontroller to emit light.

A LED or other type of light source 320 may be used according to implementations disclosed herein (e.g., visible or infrared light sources). The reflective material 310 may reflect the first signal from the LED to an infrared receptor (or light receptor) 350. The reflected first signal may constitute a second signal. The infrared receptor (or light receptor) 350 may be configured to receive the second signal from the infrared LED. The light receptor may be disposed at a distance from the reflective material. As shown in FIG. 3A, the reflective material 310 is disposed on the interior portion of the ring opposite from the photocell 330, LED 320, microcontroller 360, and light receptor 350. The light receptor may be configured to detect or receive only in a wavelength of the light source or a range that includes the wavelength of the light source. The range may be narrowly defined to eliminate false positive readings by the light receptor. The positions of some components of the device may be altered from that shown in FIG. 3. For example, the micro-controller may be distally positioned from the light receptor 350. The reflective material may be positioned along the interior of the token at any angle that allows it to reflect the first signal from the light source to the light receptor.

The microcontroller 360 may perform several functions. It may accumulate power from the photocell 330 or a capacitor as described above. The microcontroller 360 may provide the first signal to the infrared LED. For example, the microcontroller may issue a command to the infrared LED to emit light, or emit a pattern of light (e.g., blink) as the first signal. In some configurations, the command may not be issued until the microcontroller has accumulated a threshold amount of power. The microcontroller 360 may be configured to receive an indication of the second signal from the light receptor (e.g., visible or infrared light). The second signal may refer to the light that is received or detected by the light receptor or a computer readable representation of the light received by the light receptor. The second signal may refer to an indication that light has been received or detected by the light source (e.g., the infrared LED). For example, a flag may be set in a memory module to indicate that the second signal has been received by the light receptor. As stated earlier, the light receptor may be configured to detect light only in the wavelength of the light source to reduce contamination from other light sources and thereby cause the light receptor to indicate that it has received or detected the second signal.

The microcontroller 360 may compare the first signal to the second signal. For example a blink pattern (i.e., the first signal) may be emitted by an infrared LED 320. The reflective material 310 may return the blink pattern (i.e., the second signal) to the infrared receptor. The microcontroller 360 may receive an indication of the first signal in a variety of ways. In an example, the microcontroller 360 issues a command to the infrared LED 320 to emit light and the command may indicate the blink pattern or the light source may be pre-programmed to emit light in a specified pattern. The infrared receptor 350 may indicate that it emitted light to the microcontroller 360 and, in some configurations, the emitted blink pattern. The infrared receptor 350 may provide an indication to the microcontroller that it has received or detected light. The infrared receptor 350 may delay transmission of the indication to determine whether or not a blink pattern was sent by the light source or it may send an indication to the microcontroller each instance of light detection. The microcontroller 360 may then compare the blink pattern sent (e.g., the first signal) to that received by the infrared receptor (e.g., second signal).

The microcontroller 360 may determine that the first signal and the second signal match and disable the wearable device based on this determination. If the first signal and the second match, it is an indication that the wearable device has been removed from a user's person (e.g., a ring was removed from the user's finger). If the user maintains the token on the user's person (e.g., the ring is on the user's finger), then the light source may emit light, but it would not reach the reflective material and/or the light receptor. Thus, the microcontroller may receive an indication that light was transmitted or the first signal. But, it would not receive a second signal.

In some configurations, time logic may be a component of the programming of the microcontroller. For example, the microcontroller may disregard the first signal if a second signal does not appear within a few milliseconds of the first signal being received by the microcontroller (or indication thereof). Likewise, the light source may be pre-programmed to emit light or pattern of light at a time interval. The microcontroller may determine the frequency of light emission by the light source. The microcontroller may issue a command for the light source to emit light based on the last time the token was used for an authentication attempt, the last time the light source emitted light, the amount of power in the capacitor, or a predetermined time interval (e.g., every 30 minutes). In some configurations, the blink pattern may be associated with a time reference and microcontroller may determine that if the second signal is not received within a specified time of the first signal, the device is being worn. In such a configuration, the microcontroller may also determine whether or not the light source has power to emit light. In the event the light source does not have power, the microcontroller may determine that it should lock the device because it no longer possesses the ability to determine whether or not the token is being worn.

Disabling the wearable device may prevent the wearable device from authenticating to a second device. For example, if a user removes a ring from the user's finger, the ring may conduct a wear test as described above. The light source may emit light and if light is received by the light receptor, the ring may be placed into a locked state. The user would not be able to use the ring to authenticate to the user's smartphone in this example. Disabling the wearable device may include erasing or resetting the computer readable storage such as by overwriting the storage with zeros or ones.

The wearable device or token may contain a coil 342 and a microchip 344 that is shown in FIGS. 3A and 3B at 340. The coil may be, for example, a near field communication ("NFC") coil that vibrates in response to an electromagnetic field. Vibration of the coil 342 may generate power as well. A microchip 344 may be configured to obtain power from the coil 342 and the unlock code in the computer readable storage module 370. The microchip 344 may provide the unlock code to a second device (e.g., computer, laptop, smartphone, tablet, keypad, door, etc.).

As an example of how the device may be used, a user may purchase the wearable device, such as a ring, at a store. The ring may not have an unlock code associated with it such as a compatible PIN. The unlock code may be user programmable. During initial set up of the ring, the user may place the ring on a finger and hold it in proximity to a second device, such as a smartphone. Being in proximity to the smartphone's electromagnetic field may cause power to be provided to the microchip on the ring through a coil (e.g., NFC coil). The microchip may attempt to obtain an unlock code from the computer readable storage module and find none since the ring has not yet been set up. It may communicate the lack of finding an unlock code to the smartphone. In some configurations, the smartphone may be configured to detect the presence of the token as a component of the operating system or through an application executed on the smartphone that may be operating the background, for example. The smartphone may indicate to the user that it does not have an unlock code from the ring or that the ring is locked. In some configurations, a separate flag may be established in separate memory module to indicate whether or not the wearable device has been previously programmed with an unlock code or not. For an instance where the flag indicates that the device has not been previously programmed with an unlock code, the smartphone may prompt the user to enter an unlock code for the smartphone after logging into the smartphone. The user may enter a PIN, for example, as the unlock code for the ring and the ring may change the flag to indicate that it has been programmed with a PIN or unlock code. The PIN may be different from the unlock code from the smartphone. The ring may, however, store a hash of the PIN and/or the smartphone's access code in the computer readable storage module.

The separate memory module may be capable of receiving write and read commands during initial programming of an unlock code. It may be powered by a capacitor, the photocell, and/or the coil as described above. The separate memory module may change from having read and write capabilities to read only function after the initial set up of the ring or wearable device is completed. Thus, it may contain an indication that the ring has been previously programmed with an unlock code and/or what the unlock code is in the form of a hash or other encrypted techniques to prevent hacking of the ring by itself to obtain the unlock code.

The smartphone's serial or device identification number may be stored in the computer readable module or in separate memory module on the ring to prevent usage of the ring with another device if the ring is stolen. For example, the device identification number can be compared to that of the smartphone and if they do not match, the ring may not provide a prompt for a user to re-enter an unlock code. Instead, it may indicate to the user that it is not configured for the device. Likewise, the smartphone may store an indication that it has been paired with the ring, such as the ring's serial or device identification number, and the ring's unlock code in an encrypted state. For example, the smartphone may recognize that the ring may contain a PIN that can be used to unlock or access the phone independent of the code the user would utilize in absence of the ring to access the smartphone. Thus, when the ring is in proximity to the smartphone and is detected by the smartphone, the ring may transmit the unlock code to the smartphone which may compare the unlock code with the ring's device identification number that it has stored to determine whether or not access to the smartphone or components thereof should be granted.

After the initial set up of the device described above, the user may now authenticate to the smartphone using the ring so long as the user does not remove the ring from the user's finger. For example, the user may pick up the smartphone with the hand that has the finger wearing the ring. The coil in the ring may again become powered and the microchip may obtain the PIN or a hash of the PIN and the smartphone's access code from the computer readable storage module and present it to the phone for access to the phone or a component thereof. A component of the smartphone may refer to a subset of applications, processes on the phone, or component of applications. For example, a user's PIN may grant access to only a portion of a contact list or the ability to send/receive email or phone calls. Another user's PIN may grant complete access to all of the functions or applications etc. on the phone. Thus, more than one token may be paired with a device and each token may be configurable as to the level of access that the token provides the bearer.

During the time that the user wears the ring, the light source may attempt to emit light at a specified interval (e.g., every hour). The user's finger, however, blocks light from reaching the reflective material and, therefore, the light receptor cannot provide an indication of the second signal or provides an indication of the light it has detected, which would be minimal and/or not in the wavelength of that emitted by the light source. The microcontroller may determine that the first signal (e.g., the wavelength of light emitted, the pattern of light emitted, the indication that light has been emitted, etc.) does not match the second signal (e.g., an indication that no or minimal light has been received, light of a wavelength different from that of the light source has been received, the pattern of light received differs from that emitted by the light source, etc.). In this example, the microcontroller may not perform any further function. The ring may continue to be used to authenticate the user to the smartphone.

However, if the user removes the ring and a wear test is performed whereby the light source emits light, the microcontroller may determine that the first signal and the second signal match, indicating that the user removed the device. In this instance, the microcontroller may erase the computer readable storage module that contains the unlock code or a hash of the unlock code and the smartphone's PIN. When the user again adorns the ring, the ring will not authenticate the user to the smartphone. The coil will power the microchip which will attempt to obtain the unlock code from the computer readable storage module; but, it will not find one. The smartphone may then indicate to the user that the ring must be authenticated "manually" by the user providing the unlock code to the computer readable storage module.

In some configurations, the smartphone may read the flag that indicates the ring has been previously programmed with an unlock code or the ring may indicate to the smartphone that it has been previously programmed with an unlock code. The user may enter the unlock code for the ring which may be compared to the code stored in the separate memory module (which is now read only). The comparison may be performed by the microcontroller, the microchip, or a processor on the smartphone. The separate memory module may only allow reads of it receives an indication that the computer readable storage module does not contain the unlock code and/or that the smartphone the ring was originally with which the ring was originally paired is making the request.

In other configurations, the separate memory module may not exist and the device to which the token was previously paired with (e.g., a smartphone) may have stored an indication that it was paired with the particular ring once before. Further, the smartphone may store an indication of the unlock code for the ring in an encrypted format. The smartphone may obtain the unlock code upon discovery that the token does not contain the unlock code and the entry of the unlock code for the smartphone. Upon obtaining the unlock code, the token may again be programmed with the unlock code in the computer readable storage module and used as described above.

Figure 4:
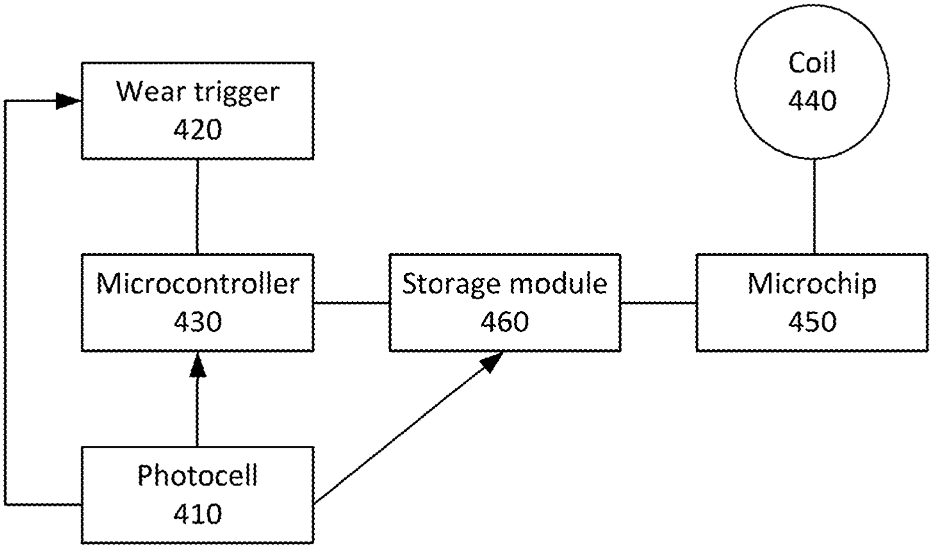
FIG. 4 is an example system for using a wearable device to authenticate a user to a second device according to an implementation disclosed herein.

In an implementation, as shown in the example in FIG. 4, a system is provided that includes a wearable device. The wearable device may include a photocell 410, a wear trigger 420, a microcontroller 430, a coil 440, a microchip 450, and a computer readable storage module 460. The wear trigger may be configured to provide an indication of whether or not the wearable device is being worn to the microcontroller such as by a pressure switch or a light-based detection system described above. The microcontroller may disguise an unlock code stored in the computer readable storage module if it receives an indication that the wearable device is not being worn. The coil may generate power form an electromagnetic field of a second device that powers the microchip. The microchip may be configured to obtain the unlock code from the computer readable storage module and communicate the unlock code to the second device. The unlock code may authenticate the wearable device to the second device.

The second device (e.g., a tablet, a smartphone, a laptop, a steering wheel of a car, etc.) may be configured to emit an electromagnetic field that can be utilized by the coil to power the microchip and/or other circuitry as needed. The second device may request authentication from the microchip of the wearable device. For example, the second device may query the wearable device or token when the token's presence is detected by the second device. The second device may receive the unlock code from the microchip of the wearable device or token. The second device may authenticate the wearable device to the second device.

Figure 5:
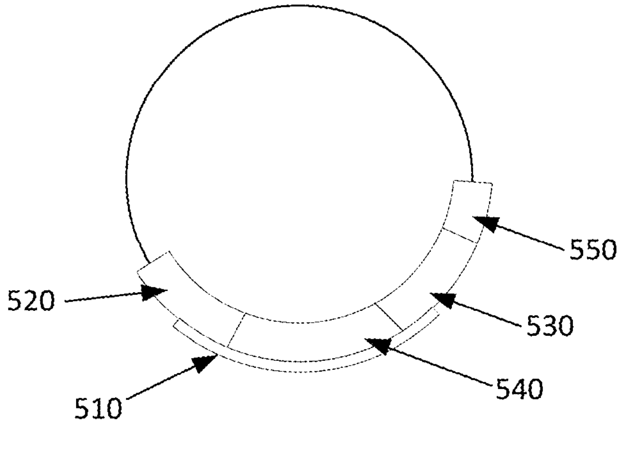
FIG. 5 is an example of a wearable device as disclosed herein.

In an implementation, a wearable device or token is disclosed as shown by the example provided in FIG. 5. The wearable device may include a photocell 510 configured to provide power to at least one of a microcontroller 520, a wear trigger 530, and a computer readable storage module 540. The wearable device may have an interior cavity that may accommodate a portion of a user's body. For example, if the wearable device is a bracelet, glove, watch, or ring, the interior cavity may accommodate a user's wrist, hand, or finger respectively. The interior cavity does not need to be fully defined by the wearable device. Similarly, the wearable device does not need to form a closed loop. For example, a bracelet may be a cuff style bracelet. The computer readable storage module configured to temporarily store an unlock code as described above.

The wear trigger may be configured to detect the presence of a part of a user's body within the interior cavity and provide an indication to the microcontroller whether the part of the user's body is detected within the interior cavity. For example, the wear trigger may be pressure sensor or the light sensor system described earlier. In some configurations, the wearable device may have a sensor to determine whether or not it is being worn by a user. For example, the wearable device may include a bio sensor that detects a user's heart rate. The wear trigger may periodically or constantly provide feedback or an indication to the microcontroller as to whether or not the wearable device is being worn. Cessation of a signal from the wear trigger may be an indication to the microcontroller that the wearable device is not being worn by a user, for example, if the wear trigger is a pressure sensor or switch. The microcontroller may determine, based on the indication provided by the wear trigger that the wear trigger does not detect part of the user's body within the interior cavity of the device and it may disable the wearable device. As described earlier, the wearable device may be disabled, for example, by erasing the unlock code in the computer readable storage module. The wearable device may also include a coil and microchip 550 configured to perform functions that were described above (e.g., to authenticate the wearable device to a second device).

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A wearable device, comprising:

a photocell configured to provide power to at least one of a microcontroller, an infrared light emitting diode, and a computer readable storage module;

the computer readable storage module configured to temporarily store an unlock code;

an infrared light emitting diode configured to emit a first signal received from the microcontroller;

a reflective material configured to reflect the first signal from the infrared light emitting diode to an infrared receptor, wherein the reflected first signal is a second signal;

the infrared receptor configured to receive the second signal from the infrared light emitting diode, wherein the infrared receptor is disposed at a distance from the reflective material;

the microcontroller configured to:

accumulate power from the photocell;

provide the first signal to the infrared light emitting diode when a threshold amount of power has been accumulated by the microcontroller;

receive the second signal from the infrared receptor; and compare the first signal to the second signal.

2. The device of claim 1, the microcontroller further configured to:

determine that the first signal and the second signal match; and disable the wearable device based on the determination that the first signal and the second signal match.

3. The device of claim 2, wherein disabling the wearable device prevents the wearable device from authenticating to a second device.

4. The device of claim 3, wherein disabling the wearable device comprises erasing the computer readable storage.

5. The device of claim 3, wherein disabling the wearable device comprises resetting the computer readable storage.

6. The device of claim 1, further comprising a capacitor configured to store the power generated by the photocell, wherein the capacitor provides power to at least one of the microcontroller, the infrared light emitting diode, and the computer readable storage module.

7. The device of claim 1, further comprising:

a coil that vibrates in response to an electromagnetic field, wherein vibration of the coil generates power;

a microchip that is configured to:

obtain power from the coil;

obtain the unlock code in the computer readable storage module; and provide the unlock code to a second device to authenticate the wearable device to the second device.

8. The device of claim 1, wherein the wearable device is selected from the group consisting of a ring, a bracelet, a watch, and a glove.

9. A system comprising:

a wearable device comprising a photocell, a wear trigger, a microcontroller, a coil, a microchip, and a computer readable storage module, wherein the wear trigger is configured to provide an indication of whether or not the wearable device is being worn to the microcontroller, the wear trigger comprising:

a light emitting diode configured to emit a first signal received from the microcontroller, a reflective material configured to reflect the first signal from the light emitting diode, wherein the reflected first signal is a second signal, and a receptor configured to receive the second signal;

wherein the microcontroller disguises an unlock code stored in the computer readable storage module if it receives an indication that the wearable device is not being worn;

wherein the coil generates power from an electromagnetic field of a second device that powers the microchip;

wherein the microchip is configured to:

obtain the unlock code from the computer readable storage module; and communicate the unlock code to the second device, wherein the unlock code authenticates the wearable device to the second device;

the second device configured to:

emit the electromagnetic field;

request authentication from the microchip of the wearable device;

receive the unlock code from the microchip;

authenticate the wearable device to the second device.

10. The system of claim 9, wherein the wear trigger comprises an infrared light emitting diode and an infrared receptor.

11. The system of claim 9, further comprising a capacitor configured to store power generated by the photocell and provide power to the microcontroller, wear trigger, and computer readable memory module.

12. The system of claim 11, wherein absence of a charge in the capacitor disables the wearable device.

13. The system of claim 9, wherein the wearable device is selected from the group consisting of a ring, a bracelet, a watch, and a glove.

14. A wearable device, comprising:

a wear trigger comprising:

a light emitting diode configured to emit a first signal received from the microcontroller, a reflective material configured to reflect the first signal from the light emitting diode, wherein the reflected first signal is a second signal, and a receptor configured to receive the second signal;

a photocell configured to provide power to at least one of a microcontroller, the wear trigger, and a computer readable storage module;

wherein the wearable device comprises an interior cavity to accommodate a portion of a user's body;

the computer readable storage module configured to temporarily store an unlock code;

the wear trigger configured to:

detect the presence of a part of a user's body within the interior cavity;

provide an indication to the microcontroller whether the part of the user's body is detected within the interior cavity; and the microcontroller configured to disable the wearable device if the wear trigger does not detect the part of the user's body within the interior cavity.

15. The device of claim 14, further comprising:

a coil that vibrates in response to an electromagnetic field, wherein vibration of the coil generates power;

a microchip that is configured to:

obtain power from the coil;

obtain the unlock code in the computer readable storage module; and provide the unlock code to a second device to authenticate the wearable device to the second device.

16. The device of claim 14, wherein the first signal is emitted in a blink pattern.

17. The device of claim 14, wherein disabling the wearable device comprises erasing the computer readable storage.

18. The device of claim 14, wherein the wearable device is selected from the group consisting of a ring, a bracelet, a watch, and a glove.

* * * * *